United States Patent [19]

Colburn

[11] Patent Number: 5,378,278
[45] Date of Patent: Jan. 3, 1995

[54] CEMENT COMPOSITIONS FOR TEMPORARY STRUCTURES

[76] Inventor: Howard E. Colburn, 14572 Guama, Irvine, Calif. 92714

[21] Appl. No.: 96,607

[22] Filed: Jul. 23, 1993

[51] Int. Cl.$^6$ ............................................. C04B 7/13
[52] U.S. Cl. ................................... 106/709; 106/606; 106/624; 106/706; 106/718; 405/266
[58] Field of Search ............... 106/709, 606, 624, 706, 106/718; 405/266

[56] References Cited

U.S. PATENT DOCUMENTS 5,084,102  1/1992  Brouns et al. ....................... 106/709

FOREIGN PATENT DOCUMENTS 1375832  11/1974  United Kingdom ................. 106/709

*Primary Examiner*—Anthony Green
*Attorney, Agent, or Firm*—Harness, Dickey & Pierce

[57] ABSTRACT

A cement composition for temporary, environmentally sound structures, including berms for erosion and flood control, comprising portland cement, flyash, sodium silicate, water and aggregate in predetermined amounts to obtain a pumpable cement composition having less than 2 inches of slump and a 28 day compressive strength of between about 100 and about 400 psi.

12 Claims, No Drawings

CEMENT COMPOSITIONS FOR TEMPORARY STRUCTURES

BACKGROUND OF THE INVENTION

This invention is directed to a concrete composition that can be easily made from conventional materials in a ready-mix concrete plant and utilized to make temporary structures, especially flood control and erosion control berms.

Sandbags have been used to construct temporary berms to control flooding and erosion along creeks, streams, rivers, ponds and the like and around construction sites, especially construction sites having slopes. Classically, sandbags were made from canvass or gunny sack woven bags and filled with earth or sand. With time, the fabric of the cloth bags exposed to the elements would deteriorate exposing the contents of the bags to the elements which permitted the elements to slowly erode away the sandbag berm. In recent years, most of the sandbags have been made of polymeric bags, conventionally polyethylene bags which are frequently colored bright orange, bright red or black. The portions of the bag that are exposed to the elements, especially sunlight, deteriorate with time. However, the deterioration is not uniform and large pieces of the polymeric material remain or are scattered across the landscape by winds, water and the like. The portions of the cloth or polymeric bags that are covered by dirt or sand, are resistant to breakdown and will remain in the environment for many years if they retain a cover, even a thin cover of dirt.

Most local governments have enacted environmental regulations requiring that berms built up of sand bags must be removed after the need for the berm has disappeared. This is an expensive and time-consuming job as it requires that the bags be uncovered, emptied of their contents and collected.

Sometimes more permanent berms are prepared. These berms are prepared with earth to form a dam-like structure which is then covered with plastic sheeting or with a layer of asphalt or thin concrete. These types of berms present the same environmental problems that sandbags present. In fact, if asphalt or a thin concrete surface layer has been applied over the earthen berm, the tear-down of the berm is more costly because the concrete and asphalt must be collected and removed to a landfill area.

Another type of earth berm is prepared with earth which is then trenched out in the center to have a trench extending down about 3 to 6 inches into the firm earth. The resulting narrow trench is filled with concrete to form a support structure and backbone for the earth berm. Thus, when the berm is subjected to heavy water runoff, the earth portion of the berm may be eroded away leaving the concrete backbone to function as a wall. The berm in this case functions as a concrete form after the trench has been dug. The sidewalls of the berm and the portion of the trench dug into the underlying earth serve as form walls for the concrete. This type of berm, although very rugged and able to withstand substantial runoff over a lengthy period of time, is an expensive type of berm to break up after its need has disappeared. The concrete must be broken up and trucked away to a disposal site or order to return the landscape to its original form.

It is an object of the present invention to provide a new type of berm construction material which can be easily prepared in conventional ready-mix concrete plants. It is a further object of the present invention to provide a berm construction material which has sufficient strength to function as a floodwater and erosion control berm material. It is still another object of the present invention to provide a berm building material that can be easily broken up and allowed to return to the land without any environmental implications.

SUMMARY OF THE INVENTION

The present invention is directed to a non-structural cement composition for temporary structures comprising:

portland cement, flyash, sodium salts of silicic acid (hereinafter referred to as "sodium silicate"), water and aggregate. Non-structural materials are materials that do not have sufficient strength for load bearing purposes.

Sufficient water and sodium silicate are used in the cement composition to yield a cement composition having less than 2 inches of slump and a 28 day compressive strength between about 100 and 400 pounds per square inch ("psi"). The slump and compressive strength are determined by standard ASTM procedures. The cement, flyash and sodium silicate ratio in weight percent is from about 30 to less than 50 weight percent portland cement, more than 50 to about 70 weight percent flyash and about ½ to 4 weight percent sodium silicate. The water to cement weight ratio in the cement composition is between about 1.42 and about 1.92. The cement to aggregate weight ratio is between about 0.02 and 0.03. It is preferred to use a minimum of cement and still retain the 2 inch slump and the 28 day compressive strength of between about 100 and about 400 psi. The final cement composition weighs about 3,800 pounds, plus or minus 100 pounds per cubic yard. In the preferred embodiment of the present invention, the water to cement weight ratio is about 1.78, and the cement to aggregate weight ratio is about 0.024.

The cement composition typically contains, on a cubic yard basis, 60 to 99 pounds of portland cement, 101 to 140 pounds of flyash, ½ to 10 pounds of sodium silicate, 283 to 383 pounds of water and 3,300 to 3,400 pounds of aggregate.

Virtually any portland cement can be used in the present invention. Similarly, virtually any flyash produced by combustion of powdered coal with forced draft and recovered from the flue gases can be utilized in the present invention. The sodium silicate can be utilized either in the anhydrous form or as a sodium silicate aqueous solution. In the preferred embodiment of the present invention, aqueous solutions of sodium silicate are preferred and are available from a number of sources, such as Occidental Chemical Corporation which supplies sodium silicate liquid alkaline, sodium silicate liquid, sodium silicate liquid siliceous and the DYNALITE brand of aqueous solutions of sodium silicate. Potassium salts of silicic acid can be utilized equally well in place of sodium silicate.

The aggregate concrete grade is minus ⅜ inch particle size (U.S. mesh) down to concrete construction sand (plus 320 mesh size particles). Such aggregate is commonly used in concrete and is washed and/or blown free of dirt, dust and other debris. Preferably the aggregate is minus ⅜ inch particle size (U.S. mesh) with about 95 percent of the particles plus 200 mesh. Number 5 rock aggregate can be used in the cement composition, which is a cost savings over Number 1 or 2 rock aggregate. In the preferred embodiment of the present invention, the composition is prepared at a ready-mix plant, minus the sodium silicate. The mixing of the composition is done in a cement truck and the mixture is maintained in agitation until poured. The sodium silicate is preferably added to the composition just prior to the pour by adding the sodium silicate directly to the composition and allowing it to thoroughly mix within the composition in the cement truck.

Because of the extremely low slump (2 inches or less) of the cement composition, the cement composition can be poured, pumped or shoveled to form cement composition monolith structures, such as berm walls 3 to 5 inches in depth and 8 inches or more in height. Before the cement composition monolith structure sets, the monolithic structure can be sculptured using trowels, shovels or wood boards. Forms are not required.

Normally a concrete composition requires a high slump in order to fill the void between the forms or to pump the concrete composition.

It is believed that the sodium silicate of the present invention acts as a lubricant, making the low slump cement composition pumpable through conventional concrete pumping equipment and as a thiotropic agent, that has little effect on the viscosity of the cement composition when the composition is agitated, but quickly thickens the cement composition after it has been laid, i.e., poured, pumped or shoveled.

The cement composition sets up quickly once laid and becomes water resistant in less than 8 hours, that is, the cement composition structure after 8 hours of set up time is resistant to breakdown by rainfall and water flow. Thus, cement composition structures can be quickly created even when rainfall or water flooding are deemed imminent. The cement composition can also be used as a covering layer for earthen berms in place of asphalt and concrete.

Besides being quickly erected, cement composition monolith structures are easily rubberized into aggregate and sand size particles when the need for the structure has disappeared. Because the cement composition has a low 28 day compression strength, between about 100 and 400 psi, the monolithic structures can easily be broken apart with shovels and spades, pick axes or various hand tools. The monolithic structures can also be broken down with graders, bulldozers and the like. The components of the cement composition are environmentally safe, that is, the cement composition particles are environmentally sound. The particles of the broken up cement composition monolithic structure can be left in place because of their environmental acceptance, they can be spread around to prevent concentrations of aggregate and/or they can be buried or partially buried. Thus, in contrast to conventional temporary structures using concrete, asphalt material and/or sandbags, the present cement composition structures after destruction leave no environmentally objectionable residue, trash or junk.

Although the present cement composition can be conveniently pumped with conventional concrete pumping equipment, or shoveled, or poured into free standing monolithic structures without forms, the composition can also be pumped, poured or shoveled into forms.

EXAMPLE

A cement composition was prepared using 17.84 gallons of water per sack of cement and using 2.13 sacks of cement per cubic yard of aggregate to give a water to cement weight ratio of the cement composition of 1,581. The cement type was portland cement II and contained type F flyash. The final composition contained 80 pounds of cement, 120 pounds of flyash, 317 pounds of water, 1,179 pounds of no. 5 rock and 2,190 pounds of w.c. sand to yield a cement composition weighing 3,886 pounds per cubic yard (143.9 pounds per cubic foot). The composition was prepared in a cement truck and 7.12 pounds of sodium silicate in 1 and ½ gallons of water were added to each cubic yard of composition in the cement truck at the jobsite to yield the final cement composition of the present invention.

No. 5 rock is composed of aggregate, 100 percent of which passes a 0.375 inch sieve, 88.1 percent passes a no. 4 sieve (U.S. standard), 36.1 percent passes a no. 8 sieve, 15 percent passes a no. 16 sieve, 7.2 percent passes a no. 30 sieve, 2.0 percent passes a no. 100 sieve and 1.3 percent passes a no. 200 sieve. Thus, the No. 5 rock aggregate is 100 percent minus 0.375 inch and 95 percent plus no. 200 sieve. The w.c. sand is formed of particles, 100 percent of which pass a 0.375 inch sieve, 97.4 percent pass a no. 4 sieve, 85.1 percent pass a no. 8 sieve, 61.4 percent pass a no. 16 sieve, 37.6 percent passed a no. 30 sieve, 19.7 percent passed a no. 50 sieve, 9.3 percent passed a no. 100 sieve and 5.0 percent passed a no. 200 sieve.

The resulting composition had a ½ inch slump and a 28 day compression strength of 115 psi.

The composition was used to prepare berms on a construction site. The berms height varied from 4 to 12 inches. The berms survived severe rain storms and heavy water runoff.

What is claimed is:

1. A non-structural cement composition for temporary, environmentally sound structures consisting essentially of portland cement, flyash, sodium silicate, water and aggregate of 100 percent minus ⅜ inch particle size, the water to portland cement weight ratio in the cement composition being between about 1.42 and about 1.92, and the cement to aggregate weight ratio being between about 0.02 and about 0.03, the ratio by weight percent of the portland cement, flyash and sodium silicate being about 30 to less than 50 weight percent portland cement, more than 50 to about 70 weight percent flyash and about ½ to about 4 weight percent sodium silicate, the cement composition having less than 2 inches of slump and a 28 day compressive strength of between about 100 and about 400 psi.

2. The cement composition according to claim 1 wherein the cement aggregate weight ratio is about 0.024.

3. The composition according to claim 1 wherein the water to cement weight ratio is about 1.78 and the cement to aggregate weight ratio is about 0.024.

4. The cement composition according to claim 1 wherein the particle size distribution of the aggregate is between 100 percent minus 0.375 inches and 95 percent plus 200 mesh.

5. The cement composition according to claim 1 wherein the cement composition per cubic yard comprises 60 to 99 pounds of portland cement, 101 to 140 pounds of flyash, ½ to 10 pounds of sodium silicate, 283 to 383 pounds of water and 3,300 to 3,400 pounds of aggregate.

6. A method of creating a temporary environmentally sound structure for flood or erosion control comprising forming a structure from a non-structural cement composition consisting essentially of portland cement, flyash, sodium silicate, water and aggregate of 100 percent minus ¾ inch particle size, the water to portland cement weight ratio in the cement composition being between about 1.42 and about 1.92, and the cement to aggregate ratio being between 0.02 and about 0.03, the ratio by weight percent of the portland cement, flyash and sodium silicate being about 30 to less than 50 weight percent portland cement, more than 50 to about 70 weight percent flyash and about ½ to about 4 weight percent sodium silicate, the cement composition having less than 2 inches of slump and a 28 day compressive strength to between about 100 and about 400 psi.

7. The method according to claim 6 wherein the cement composition consists essentially of portland cement, flyash, sodium silicate, water and aggregate of 100 percent minus 0.375 inch particle size.

8. The method according to claim 6 wherein sufficient water and sodium silicate are used in the cement composition to yield a pumpable cement composition.

9. The method according to claim 6 wherein the water to cement weight ratio in the cement composition is about 1.78 and the cement to aggregate weight ratio in the cement composition is about 0.024.

10. The method according to claim 6 wherein the cement composition per cubic yard comprises 60 to 99 pounds portland cement, 101 to 140 pounds of flyash, ½ to 10 pounds of sodium silicate, 283 to 383 pounds of water and 3,300 to 3,400 pounds of aggregate.

11. The method according to claim 8 wherein the particle size distribution of the aggregate is between 100 percent minus 0.375 inches and 95 percent plus 200 mesh.

12. The method according to claim 6 wherein the formed structure is sculptured after it is formed.

* * * * *